UNITED STATES PATENT OFFICE.

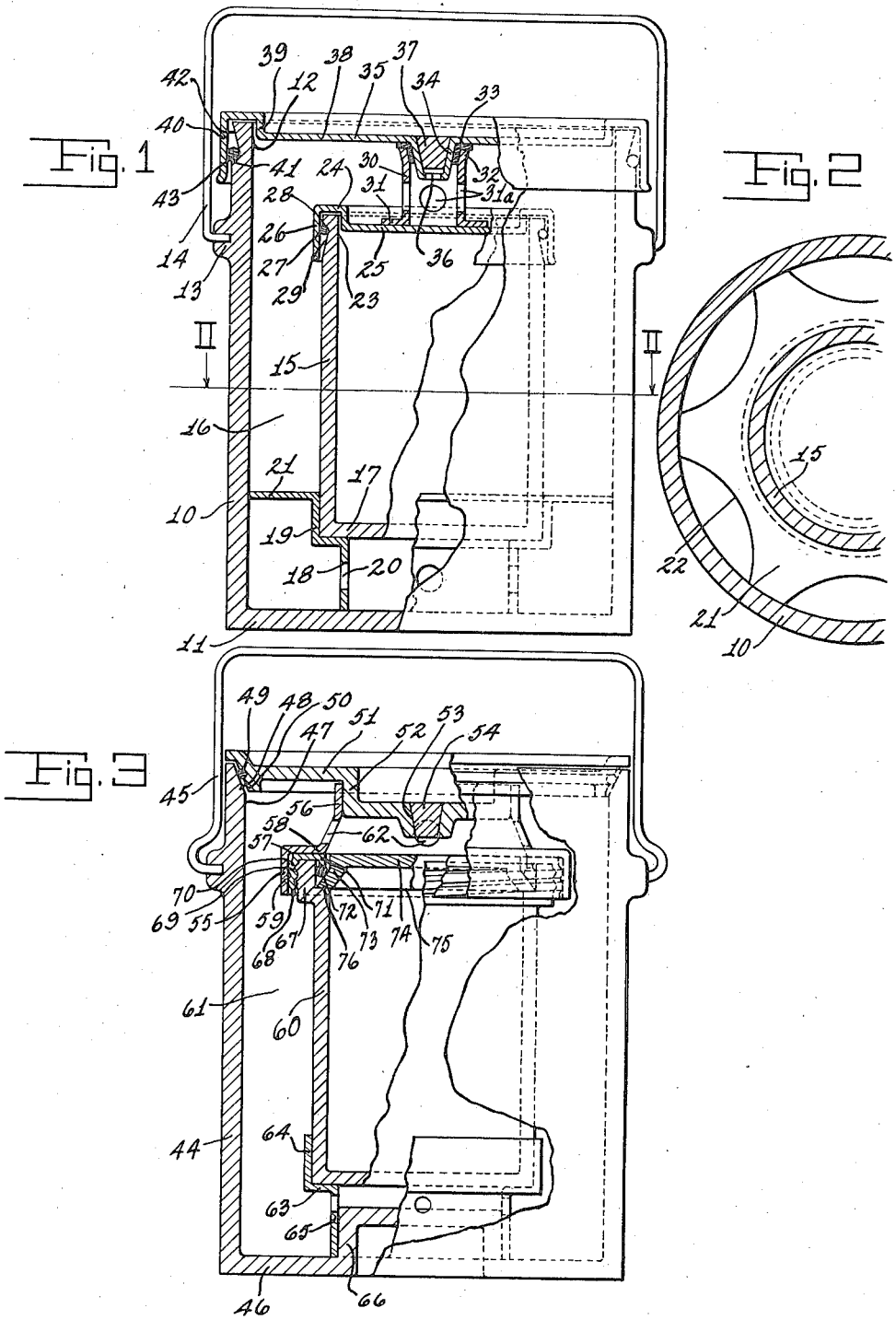

BENJAMIN W. TUCKER, OF SOUTH ORANGE, NEW JERSEY.

METHOD AND MEANS FOR PRESERVING FOOD PRODUCTS.

1,161,550.  Specification of Letters Patent. Patented Nov. 23, 1915.

Application filed March 28, 1914. Serial No. 827,940.

*To all whom it may concern:*

Be it known that I, BENJAMIN W. TUCKER, a citizen of the United States, and a resident of South Orange, county of Essex, and State of New Jersey, have invented certain new and useful Improvements in Methods and Means for Preserving Food Products, of which the following is a full, clear, and exact description.

This invention relates more particularly to a method and means whereby food products may be held in a portable vacuum container and preserved for a limited period.

One of the principal objects of the invention is to provide a simple method by which an inner member or vessel is adapted to hold food or other products either in a heated or in a cold state and inclosed by an outer member within which a vacuum is adapted to be formed by exhausting the air between the two vessels or members, and during the formation of the vacuum, each member automatically sealed.

Another object of the invention is to provide a simple and efficient portable device having an inner and an outer member or vessel each having an open end and means whereby the open ends may be sealed and the sealing means so constructed that a vacuum may be readily formed about the inner vessel or member or the vacuum destroyed.

Another object of the invention is to provide a device having an inner and an outer member each having a closure and between which a vacuum may be formed, and during the formation of the vacuum the closures will be automatically and simultaneously sealed, and when the vacuum is destroyed the same closures may be released for ready access to the interior of the vessels or members.

Other objects of the invention are to provide simple and efficient means for supporting a food holding member within an inclosing member substantially centrally thereof; to provide simple means whereby a vacuum or exhausted air space may be formed substantially entirely around the inner holding member or the vacuum destroyed; to provide simple sealing means for both vessels or members; and to provide a simple construction whereby the device is made readily portable.

A further object of the invention is to provide a device which is inexpensive to make and which may be used for trade or for household purposes.

A still further object of the invention is to provide a device which is adapted for use in connection with either heated or cold food or other products.

With these and other objects in view, the invention will be hereinafter more particularly described with reference to the accompanying drawings, which form a part of this specification, and will then be pointed out in the claims at the end of the description.

In the drawings, Figure 1 is an elevation, partly in section, of one form of device embodying my invention. Fig. 2 is a fragmentary sectional plan taken on the line II—II of Fig. 1; and Fig. 3 is an elevation, partly in section, of a different form of device from that shown in Figs. 1 and 2.

The device, Figs. 1 and 2, has an outer or inclosing member or vessel 10 provided with a closed bottom 11 and an open end 12. This member may be cylindrical in form as shown or of any other desired form, and at the upper portion thereof may be provided with integral socket lugs 13 adapted to receive the ends of a bail or handle 14 by which the device may be readily carried. An inner holding member or vessel 15 for the articles or goods to be preserved, which is somewhat smaller in length and in diameter than the member 10, is arranged substantially centrally of the member 10 so as to provide a space or chamber 16 substantially entirely about the same. This holding member 15 has a closed bottom 17 which is adapted to rest upon a removable or other support 18. The support 18 may be of poor heat conducting material or otherwise and has an angular portion 19 forming a seat for the lower part of the holding member 15. From the angular portion 19 extend legs or a substantially annular part 20 which is sufficiently open to form free communication with the chamber 16 and said part 20 is of a sufficient length to hold the bottom 17 at a suitable distance above the base 11 of the outer or inclosing member 10. A flange 21 of a spider or like form extends from the upper edge of the angular portion 19 and this flange 21 is cut away, as at 22, Fig. 2, to provide free communication with all parts of the chamber 16.

The upper end 23 of the member 15 is open and adapted to fit over said open end is a cap or closure 24. This cap or closure is ordinarily loose and free to move lengthwise of the body of the member 15 before being sealed, as will be presently described, and has an inner depressed part 25 to fit within the inner member 15 and an outer pendent flange 26 which extends for some distance along the body of said member 15. The cap is thus held against displacement on the upper end of the body of the member 15 and in such a way that it may be readily attached to or removed from said member. A seal or packing 27 of any desired form and material, as a round rubber ring, is arranged around the upper end of the body of the member 15 and is adapted to rest against the body of the member 15 and the inner surface of the flange 26 of the cap 24. The upper part of the member 15 is provided with a shoulder 28 and a beveled or tapered portion or wall 29 forming a tapering space between the upper end of the body of the member 15 and the pendent flange 26 of the cap 24. It will thus be evident that if air is exhausted from within the chamber 16, as will be presently described, the ring 27 will be forced along the beveled wall 29 and in doing so will form a perfect seal between the body of the member 15 and the flange 26 of the cap or closure 24.

The cap 24 is provided with an extension 30 having a flange portion 31 to which the cap 24 may be secured. This extension 30 is tubular in form and has a plurality of openings 31$^a$ which communicate with the chamber 16 of the inclosing member, and said extension also has an outwardly flared upper end 32. A ring of poor heat conducting material 33 is arranged on the upper flared end 32 of the extension or part 30 and this seal is adapted to be engaged by a tapering tubular part 34 of a cap or closure 35. The tapering tubular part 34 has an opening 36 over which may be arranged a valve, not shown, and within the tubular part 34 may be arranged a plug of paraffin, cork, or other material 37. The plug 37 serves as a seal for the device when in use and when removed serves as a means whereby the air may be exhausted from the chamber 16 within the inclosing member 10 or air admitted thereto. The cap or closure 35 has a depressed part 38 forming a pendent flange 39 which is adapted to fit within the upper open end 12 of the inclosing member 10 in a loose manner, and has an outer pendent flange 40 which is adapted to move lengthwise of the body of the member 10. The upper end of the body of the inclosing member 10 is provided with a shoulder 41 and a beveled wall 42 forming a tapering chamber between said wall and the inner surface of the pendent flange 40 of the cap 35. A seal or packing in the form of an annular and round ring of rubber or other material 43 is arranged in the space between the wall 42 and the pendent flange 40. The beveled wall 42 of the inclosing member 10 is oppositely arranged to the beveled wall 29 of the holding member 15 so that in the latter instance in sealing the ring 27 of the inner vessel moves downward while that of the outer vessel or member 10 moves upward and the greater the movement of the rings or packing of the two vessels or members, the more perfect will be the sealing effect.

Any suitable means may be provided for exhausting air from within the space or chamber 16. The holding member 15 is supported substantially centrally within the inclosing member by the extension 30 of the cap 24 and the member 18 at the lower portion of the holding member both of which are constructed to permit free communication between such parts and the chamber 16. It will be evident that if the goods to be preserved are placed in the holding member 10 and suitable exhausting means applied to any part of the chamber 16, the entire chamber will be exhausted thereby. The exhausting means may be applied to any part of the cap 35, or before the plug 37 is placed in position the exhausting means may be applied to the tubular part 34 so that all air within the chamber 16 may be exhausted through the openings 31$^a$ of the extension 30 and the opening 36 past the valve, if such opening 36 is adapted to be closed by such a valve, and as soon as a vacuum has been formed, the plug 37 will seal the tubular part 34. This exhausting action owing to the tendency of the air or the heated vapor within the holding member 15 to rush therefrom and the air on the outside of the inclosing member to rush within the same, will cause, during the exhausting process, the sealing means 27 and 43 to be forced into close sealing contact with the outer wall of the members 15 and 10 respectively, and the pendent flanges of the caps or closures therefor. The plug 37 is first placed in the tapering opening of the part 34 and while the chamber is being exhausted, will be permitted to move out far enough to allow the air and vapor to pass by said plug and as soon as the exhaust apparatus is removed, the plug will immediately become seated and will seal the opening through the part 34.

It will be evident that the vacuum at any time may be destroyed by puncturing or removing the plug 37 or other means by which exhaustion is effected, in which case the caps 35 and 24 may be removed from the inclosing and holding members. By sealing the inner holding member all the vapor arising from the heated products is retained within said member.

In Fig. 3 the inclosing member 44 is provided with a handle 45 for carrying purposes and is provided with an integral bottom 46 at one end and is open, as at 47, at its other end. The upper end of the inclosing member 44 on its inner surface is beveled, as at 48, and is adapted to be engaged by a seal or packing of rubber or other material 49 which is held to a beveled edge 50 of a cap or closure 51. The cap or closure 51 is provided with an inwardly extending part 52 in which is an opening 53 for a sealing plug of paraffin, or other material 54, by which the vacuum may be made or destroyed within the inclosing member 44 as already explained. A centralizing member 55 has a vertical extension 56 to fit loosely about the inwardly extending part 52 of the cap 51 and has an annular portion 57 comprising a horizontal part 58 and a pendent flange portion 59 which is adapted to fit about the upper portion of a holding member or vessel 60. This member 60 is supported substantially centrally of the inclosing member 44 so as to provide a vacuum chamber or space 61 substantially entirely about the same and the centralizing member 55 for the upper part of the holding member is provided with openings 62 which form a communication between the opening sealed by the plug 54 and the vacuum chamber 61. The lower part of the holding member 60 is supported by a cylindrical member 63 which has an angular portion 64 forming a seat for the lower portion of the holding member 60 and has a vertical part 65 which is adapted to fit about a depression 66 in the bottom 46 of the inclosing member 44. This part 65 may be provided with openings or may be of a skeleton form to permit the vacuum to extend substantially entirely about the holding member 60, and said centralizing member 63 may be of poor heat conducting or other material. At the upper part of the holding member 60 the body thereof is enlarged, as at 67, and its outer surface is threaded, as at 68, to receive the threaded part 69 of a member 70. This member 70 has an inner pendent flange 71 the lower edge of which is adapted to engage an annular seal or packing 72. This seal or packing 72 may be of rubber and of any desired form and is adapted to rest on the outer beveled surface 73 of a cap or closure 74. The cap or closure 74 is limited in its outward movement by the packing ring 72 until a proper seal is effected. An inward movement of the cap 74 beyond a certain point is prevented by reason of its inner edge 75 resting against a shoulder 76 formed at the upper inner part of the body of the holding member 60. The goods to be preserved, as in Figs. 1 and 2, are placed within the holding member 60 and the holding member with the closures placed in the position shown in the drawings. The air within the chamber 61 may be exhausted as already explained and during such exhaustion of the air by reason of the difference of the atmospheric pressure within and without the vessel or members forming the device, a perfect seal will be effected simultaneously between the caps or closures and the bodies of said members.

It will be understood that the bodies of the inclosing and holding members may be variously formed or constructed and may be of any suitable material either of glass, porcelain, metal, or of any other material, and the vessels lined with metal or otherwise as preferred and suitably insulated by poor heat conducting material as found necessary or desirable.

From the foregoing, it will be evident that a simple and efficient method is provided whereby a vacuum may be formed between an inner and an outer vessel and the two vessels automatically sealed during the formation of said vacuum; that a simple and efficient device is provided which is adapted to hold food products in either a heated or a cold state; that simple means is provided whereby a vacuum may be formed about an inner holding member or the vacuum destroyed; that simple means is provided for sealing both the inner and outer vessels or members; that said device is adapted for preserving various kinds of goods or articles; that the holding member is so supported within the inclosing member that it will not be disturbed while being transported; and that a simple and efficient device is provided which is adapted either for trade or for household purposes.

Having thus described my invention, I claim as new and desire to secure by Letters Patent:—

1. The method of preserving food products, which consists in supporting a holding member within an inclosing member and exhausting air from between said members and sealing said members while the air is being exhausted.

2. The method of preserving articles, which consists in supporting a holding member within an inclosing member and creating a vacuum about the inner member and automatically sealing the inner member while the vacuum is being formed.

3. The method of preserving articles, which consists in supporting an impervious holding member within an impervious inclosing member to provide a space about said inner member, and then exhausting air from said space to provide a vacuum and sealing the outer member as the vacuum is formed.

4. The method of preserving food products, which consists in removably supporting an impervious holding member within an impervious inclosing member to provide a chamber about said holding member, and then exhausting air from said chamber.

5. The method of preserving articles, which consists in removably supporting a holding member within an inclosing member to provide a chamber substantially entirely about said holding member, and then exhausting the air in said chamber to provide a vacuum and sealing said members while the vacuum is being formed.

6. The method of preserving articles, which consists in supporting a holding member for the article to be preserved within an inclosing member to provide a space about said inner member, and then exhausting air from said space to provide a vacuum and sealing the inner holding member as the vacuum is formed.

7. A preserving device, comprising an outer member, a holding member, a seal for each member, and means whereby a vacuum may be formed about the inner member and both members sealed as the vacuum is formed.

8. A preserving device, comprising an outer member, a holding member, a closure for each member, and means whereby a vacuum may be formed about the inner member and both members automatically sealed as the vacuum is formed.

9. A preserving device, comprising an outer cylindrical member, a cylindrical holding member, a closure for each member, and means whereby a vacuum may be formed about the inner member and both members sealed as the vacuum is formed.

10. A preserving device, comprising an outer member having a closed bottom at one end and open at the other end, an inner holding member having a closed bottom at one end and open at its other end, means for supporting said holding member substantially centrally of the outer member so as to have a vacuum space substantially entirely about the same, a detachable closure for the open end of each of said members, a seal for each closure, and means whereby the seals may become effective when air is exhausted from the space about the inner holding member.

11. A preserving device, comprising an impervious outer member having one end open, an impervious inner holding member having one end open, means for supporting said holding member substantially centrally of the outer member so as to have a vacuum space substantially entirely about the same, a detachable closure for the open end of each of said members, a seal for each closure, and means whereby air may be exhausted from or permitted to enter the space about the inner holding member.

12. A preserving device, comprising an outer member having an open end, an inner holding member having an open end and supported within the outer member to provide a space about the same, a detachable closure for the open end of each of said members, and means whereby the closures may become sealed when air is exhausted from the space about the inner holding member.

13. A preserving device, comprising an impervious outer member, an impervious inner holding member supported within the outer member to provide a vacuum space substantially entirely about the same, detachable closures for said members, and means for creating or destroying the vacuum about said holding member.

14. A preserving device, comprising an impervious inclosing member, a removable impervious inner holding member separated from said outer member by a space, closures for said members, and means for exhausting air from said space only.

15. A preserving device, comprising a cylindrical inclosing member having its body provided with a beveled outer wall, an inner cylindrical member arranged substantially centrally of the inclosing member and having its body provided with a beveled wall oppositely arranged with respect to the outer inclosing member, a closure for each member provided with a depressed portion and an inwardly extending flange, a seal for each member interposed between the beveled wall and the downwardly extending flange of each closure, and means whereby air may be exhausted from within the inclosing member to cause the closures to be sealed or air permitted to enter the inclosing member to destroy the vacuum to permit removal of the closures.

16. A preserving device, comprising a cylindrical inclosing member having its body provided with a beveled outer wall, an inner cylindrical member arranged substantially centrally of the inclosing member and having its body provided with a beveled wall oppositely arranged with respect to the outer inclosing member, a closure for each member provided with a depressed portion and an outer flange, and a seal for each member interposed between the beveled wall and the outer flange of each closure.

17. A preserving device, comprising an inclosing member having its body provided with a beveled outer wall, an inner holding member arranged within the inclosing member and having its body provided with a beveled wall oppositely arranged with respect to the inclosing member, a closure for each member, a seal for each member interposed between the beveled wall and a part of each closure, and means for simultaneously forcing the closures in sealing engagement with the members.

18. A preserving device, comprising a cylindrical inclosing member having its body provided with a beveled outer wall, an inner cylindrical member arranged substantially centrally of the inclosing member and having its body provided with a beveled wall, a closure for each member, and means whereby air may be exhausted from within the inclosing member and cause a seal between the closures and said members.

19. A preserving device, comprising a cylindrical outer member, a cylindrical holding member, a supporting member having an angular seat and adapted to support and hold the holding member substantially centrally of the outer member, a closure for the outer member, and a cap for the inner member forming a closure therefor and coöperating with the cap of the outer member to centralize the inner member within said outer member.

20. A preserving device, comprising an outer member, an inner holding member, a supporting member of poor heat conducting material having a seat and adapted to support and hold the holding member within the outer member, a cap for the outer member, and a cap for the inner holding member forming a closure therefor and coöperating with the cap of the outer member to position the inner member within said outer member.

21. A preserving device, comprising a cylindrical outer member, a cylindrical holding member, a supporting member having an angular seat and adapted to support and hold the holding member substantially centrally of the outer member, a cap for the outer member, a cap for the inner member forming a closure therefor and coöperating with the cap of the outer member to centralize the inner member within said outer member, and means in the cap of the outer member adapted to permit air to be exhausted from within said outer member or permitted to enter within the same.

22. A preserving device, comprising an inclosing member having its body provided with a beveled wall, a closure provided with a downwardly extending flange, a seal interposed between the beveled wall and the flange of the closure, said closure being provided with a tubular inwardly extending portion having an opening therein, an inner holding member, a support of poor heat conducting material adapted to form a seat for the lower portion of the holding member, said holding member having its body provided with a beveled portion at the upper edge thereof, a closure having a depressed part and a downwardly extending flange, a seal between the beveled portion of the body and said flange, a tubular extension forming a part of the closure of the holding member and having openings therethrough and provided with a flared outer end, and a heat insulating ring interposed between the flared outer end and the tubular portion of the closure of the inclosing member.

23. A preserving device, comprising an inclosing member having its body provided with a beveled wall, a closure provided with a downwardly extending flange, a seal interposed between the beveled wall and the flange of the closure, said closure being provided with a tubular inwardly extending portion having an opening therein, an inner holding member, a support adapted to form a seat for the lower portion of the holding member, a closure for said inner member, a seal between the beveled portion of the body and said flange, and a tubular extension of the closure of the holding member having openings therethrough and provided with a flared outer end adapted to fit about the tubular portion of the closure of the inclosing member.

24. A preserving device, comprising an inclosing member having its body provided with a beveled wall, a closure provided with an outer flange, a seal interposed between the beveled wall and the flange of the closure, said closure being provided with a tubular inwardly extending portion having an opening therein, an inner holding member, a support of poor heat conducting material adapted to form a seat for the lower portion of the holding member, and a closure for said holding member.

25. A preserving device, comprising an inclosing member, a closure for said member, an inner holding member, a support of poor heat conducting material adapted to form a seat for the lower portion of the holding member, said holding member having its body provided with a beveled portion at the upper edge thereof, a closure having a depressed part and a downwardly extending flange, a seal between the beveled portion of the body and said flange, a tubular extension forming a part of the closure of the holding member and having openings therethrough and provided with a flared end and adapted to coöperate with the closure of the inclosing member to assist in positioning the holding member.

This specification signed and witnessed this 27th day of March, A. D. 1914.

BENJAMIN W. TUCKER.

Witnesses:
LESTER C. TAYLOR,
C. BARTELS.